United States Patent
Mason et al.

(10) Patent No.: US 8,607,059 B2
(45) Date of Patent: Dec. 10, 2013

(54) SOFTWARE INSTALLATION PROCESS

(75) Inventors: Kim Douglas Mason, Stanmore (AU); Veronica Luke, Macquarie Park (AU)

(73) Assignee: Canon Information Systems Research Australia Pty. Ltd., New South Wales (AU)

( * ) Notice: Subject to any disclaimer, the term of this patent is extended or adjusted under 35 U.S.C. 154(b) by 1566 days.

(21) Appl. No.: 11/534,498

(22) Filed: Sep. 22, 2006

(65) Prior Publication Data

US 2007/0083518 A1    Apr. 12, 2007

(30) Foreign Application Priority Data

Oct. 4, 2005 (AU) .............................. 2005220173

(51) Int. Cl.
*H04L 29/06* (2006.01)
(52) U.S. Cl.
USPC .......................................... 713/182; 380/243
(58) Field of Classification Search
USPC ......... 380/51, 55, 247–250; 358/1.2; 713/182
See application file for complete search history.

(56) References Cited

U.S. PATENT DOCUMENTS

| | | | |
|---|---|---|---|
| 2002/0083431 A1* | 6/2002 | Machida | 717/174 |
| 2004/0064532 A1* | 4/2004 | Schacht et al. | 709/221 |
| 2005/0060649 A1* | 3/2005 | Kimura et al. | 715/526 |
| 2005/0097114 A1* | 5/2005 | Carro | 707/100 |
| 2006/0232795 A1* | 10/2006 | Tsuboi et al. | 358/1.2 |
| 2006/0244986 A1* | 11/2006 | Ferlitsch | 358/1.13 |

* cited by examiner

*Primary Examiner* — Edward Zee
*Assistant Examiner* — Chi Nguy
(74) *Attorney, Agent, or Firm* — Fitzpatrick, Cella, Harper & Scinto

(57) ABSTRACT

A method of installing software on a computer associated with a user, the computer being coupled to a system including one or more document handling devices connected to the computer via a communications network. The method includes, in a document handling device, determining a user identity associated with the user, and in at least part of the system, identifying the computer using the determined user identity and causing a software package to be transferred to the computer via the communications network, thereby causing the software to be installed.

10 Claims, 8 Drawing Sheets

SOFTWARE INSTALLATION PROCESS

FIELD OF THE INVENTION

The present invention relates to a method and apparatus for installing software on a computer associated with a user, and in particular, to remotely installing software such as a device driver, using a device coupled to the computer via a communications network.

DESCRIPTION OF THE BACKGROUND ART

The reference to any prior art in this specification is not, and should not be taken as, an acknowledgment or any form of suggestion that the prior art forms part of the common general knowledge.

Multifunction print devices (MFDs) are devices that integrate a number of hard-copy document handling functions, such as facsimile transceiver, scanner, copier and printer, in a single device. MFDs have become commonplace in the modem office environment and find particular application in the so-called "home office" where the need for each function often exists but the workload for each function does not justify a stand-alone or dedicated device.

In a computer network environment, a document may be printed from a personal computer in one location to a printer or MFD at another location. Typically a number of MFDs or printers are provided on the network, thereby allowing the user of the personal computer to select any one of a number of MFDs or printers for performing a printing job. Similar issues also arise for other jobs, such as scanning and copying of documents, in which the document may be provided to a scanner or MFD, with a resulting electronic document being forwarded to the user's computer.

However, in order to use such devices, it is often necessary for the user's computer to be correctly configured with appropriate software. Thus, for example, in the case of printing, the user's computer typically needs an appropriate printer driver to be installed, which is configured for use with the selected printing device. Similarly, in the case of reviewing a scanned document, the user's computer may require software capable of reading the relevant electronic file type.

In the event that the user's computer is not correctly configured, for example if the necessary printer driver is not installed, it is typical for the user to be required to:
1) Search for the correct type of the print driver for a specific device, by for example:
   a) Obtaining the device driver from a CD provided by the printing device or MFD; or
   b) Retrieving the device driver from a remote location such as a specific shared directory on the network, or downloading it from the Internet.
2) Check the version of the device driver to ensure that it is the newest version.
3) Manually install the device driver onto the computer used to initiate the print job.

These procedures are often time-consuming and troublesome for the user. Over the years, there have been technologies developed for partially automating, or omitting these steps.

For example, plug and play technologies allow the user to omit the step of manually downloading and installing a print driver for a specific printing device that is connected to the user's computer, or newly connected to the network. At the time of connection, the print driver is automatically installed on the user's computer, in either a completely automated fashion, or by prompting the user to enter a list of options required for the installation.

However, this method of automatic installation only applies to the fresh connection of a printing device to the user's computer and once the installation has taken place, triggering the installation of a new print driver installation requires uninstalling then reinstalling the printer.

For printing devices on the network, there are systems that provide transferral of a print driver from a printing device to the user's computer via email or FTP (File Transfer Protocol) upon request from the user. However, in this instance, the user has to first trigger the transfer of the print driver over the network by communicating with the printing device, then the printing device will reply with a message containing the print driver. The user can then choose to install the print driver they received from the said printing device. Print drivers to be distributed and installed can be stored in a remote location on a server to be retrieved and uploaded later, or they can be built-in to the printing device.

A disadvantage of this method is that the user has to know the network address of the printing device, and in many cases the network address of the printing device is not obvious, whereas the physical location of the printing device is more widely known.

The aforementioned methods and technologies can also be applied to automatically updating existing print drivers by retrieving a new version of the print driver from a computer on the network, and distributing it to other computers on the network. However, such a system is cumbersome as the system must first perform a search for the correct driver over the network, then it has to further search for computers that require the new driver. This method of print driver update does not allow any arbitrary user on the network to update only their own print driver on their computer. A further difficulty for users is identifying when to update the print driver on their machine.

A further issue with these forms of operation is that it typically requires user control of the computer in order to effect the installation. However, in the majority of network environments users are assigned limited access privileges, allowing access to network functions to be strictly controlled. In many such situations, installation of print drivers or other software is limited to administrator level privileges, which means that the majority of users are unable to update or install software, even if they are aware of the correct procedure.

SUMMARY OF THE PRESENT INVENTION

It is an object of the present invention to substantially overcome, or at least ameliorate, one or more disadvantages of existing arrangements.

In a first broad form the present invention provides a method of installing software on a computer associated with a user, the computer being coupled to a system including one or more document handling devices connected to the computer via a communications network, and the method including:
  a) in a document handling device, determining a user identity associated with the user;
  b) in at least part of the system:
    i) identifying the computer using the determined user identity; and,
    ii) causing a software package to be transferred to the computer via the communications network, thereby causing the software to be installed.

In a second broad form the present invention provides apparatus for installing software on a computer associated with a user, the apparatus comprising a system including one or more document handling devices connected to the computer via a communications network, and wherein:

a) a document handling device is for, determining a user identity associated with the user:

b) at least part of the system is for:

i) identifying the computer using the determined user identity; and, ii) causing a software package to be transferred to the computer via the communications network, thereby causing the software to be installed.

In a third broad form the present invention provides a computer program product for installing software on a computer associated with a user, the computer forming part of a system comprising one or more document handling devices connected to the computer via a communications network, the computer program product being formed from executable code which when executed by one or more suitable processors causes:

a) in a document handling device, determining a user identity associated with the user:

b) in at least part of the system:

i) identifying the computer using the determined user identity; and, ii) causing a software package to be transferred to the computer via the communications network, thereby causing the software to be installed.

BRIEF DESCRIPTION OF THE DRAWINGS

An example of the present invention will now be described with reference to the accompanying drawings, in which.

DETAILED DESCRIPTION INCLUDING BEST MODE

Figure 1:
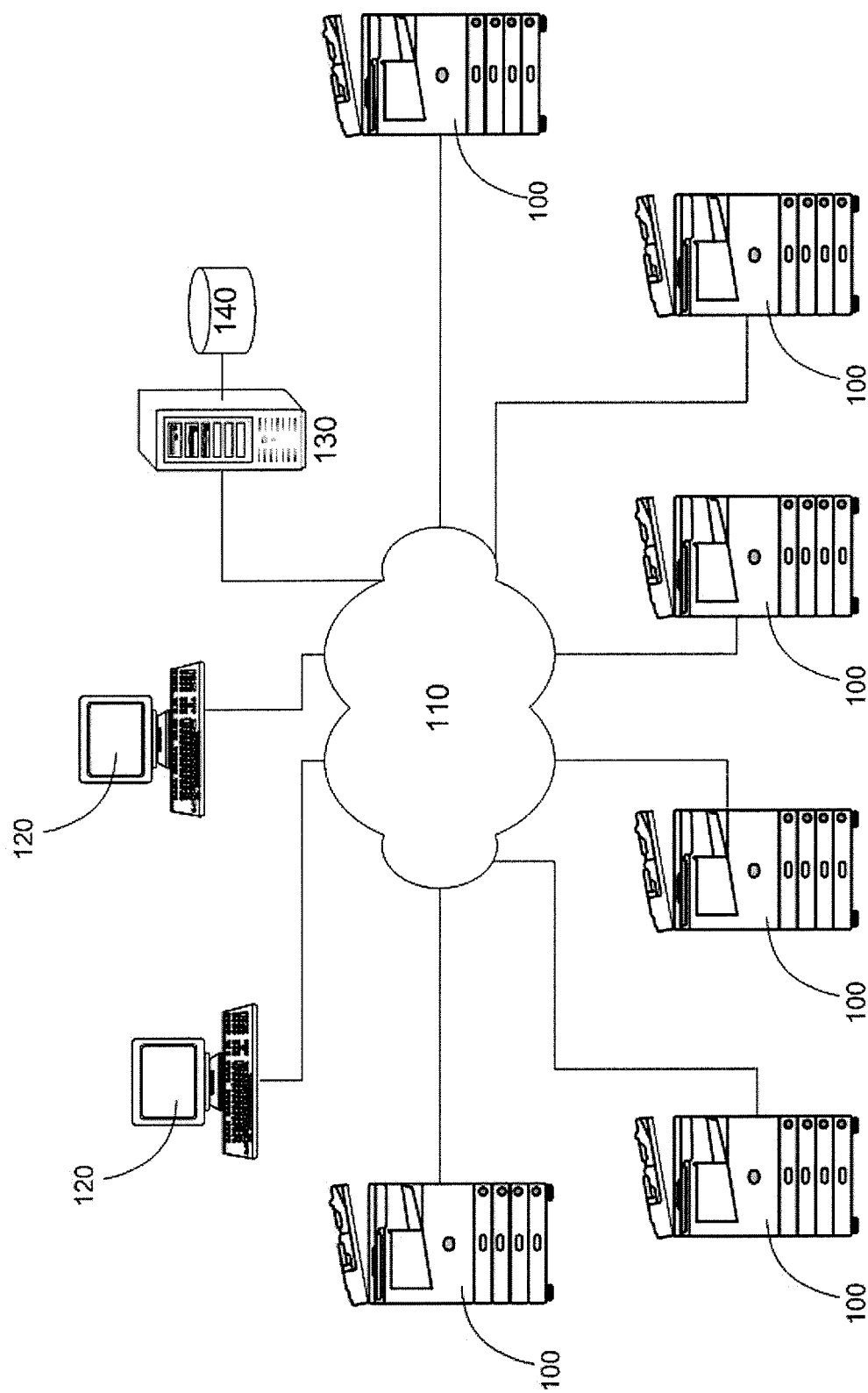
FIG. 1 is a schematic diagram of an example of a networked environment containing a number of MFDs.

An example of a system for installing applications software used in performing document handling jobs, such as document scanning, printing, copying or faxing will now be described with respect to FIG. 1.

In particular, the apparatus includes a number of Multi-Function Devices (MFDs) 100, coupled to a number of computers 120, and optionally a number of servers 130, via a communications network 110. The servers may also be coupled to one or more databases 140, as shown.

In use, the MFDs 100 are used to perform various document handling jobs, such as printing, scanning, copying, or faxing of documents, or the like. As part of this process, the computers 120 may be used to provide documents to the MFDs 100, for example in the case of printing applications, or may be used to display job results, for example following scanning of the documents by the MFDs 100.

Similarly, the servers 130 may be used to provide or receive documents used in jobs, as well as to provide additional network based activities, such as user authentication, document storage, file and print management and personal contacts management, and this may require interaction with data in the database 140.

It will therefore be appreciated that a wide range of network architectures are encompassed by the system and the configuration shown is for the purpose of example only.

Thus, for example, the communications network may be any suitable communications network, but is typically a Local Area Network (LAN) 110 such as an intranet, although may also include a Wide Area Network, the Internet, or the like. Furthermore, any number of MFDs 100, computers 120, or servers 130 may be used, and the number shown is for the purpose of illustration only.

Figure 2:
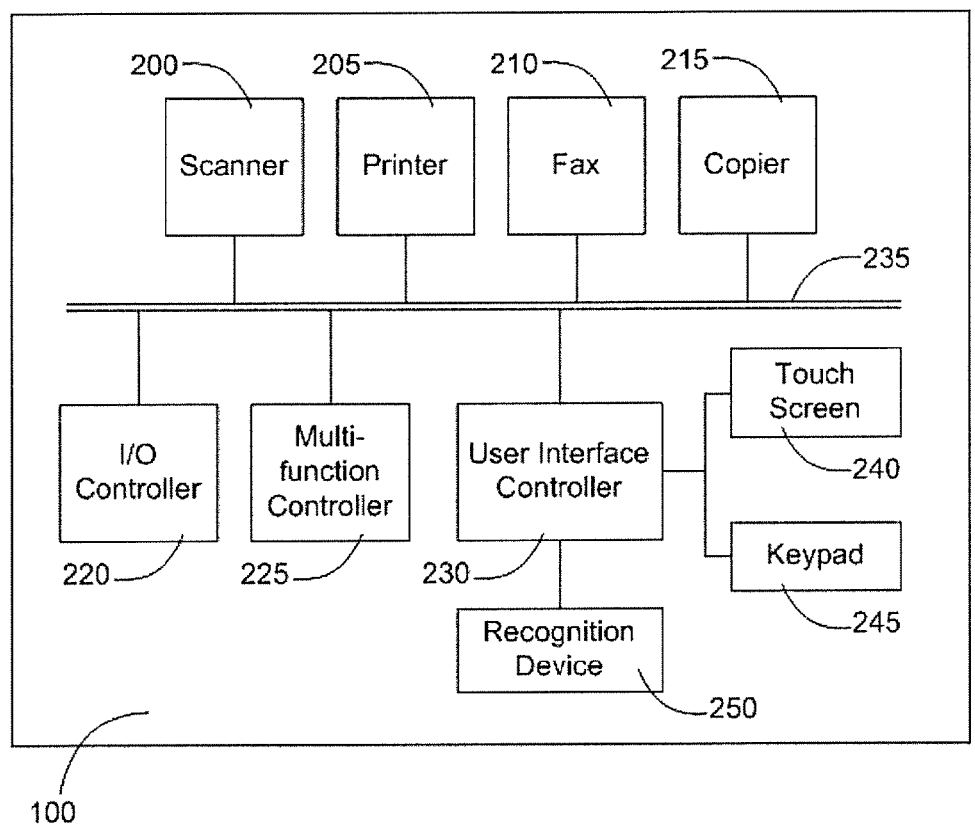
FIG. 2 is a schematic diagram of an example of an MFD.

An example of one of the MFDs 100 is shown in more detail in FIG. 2.

In this example, the MFD includes a scanner 200, a printer 205, a fax 210 unit, an optional dedicated copier 215, an Input/Output (I/O) controller 220, a multi-function controller 225, and a user interface controller 230, coupled together via a bus 235, as shown.

The user interface controller 225 is typically coupled to one or more user interface devices, such as a touch screen 240 and keypad 245, to allow a user to view information provided by the MFD 100 and provide appropriate input commands. A recognition device 250 may also be provided for obtaining information for identifying users. This may include for example a biometric scanning device, or a card sensor for sensing identity data from a swipe card, or an RFID (Radio Frequency Identification) tag reader for reading information from a suitable RFID tag.

In use, the I/O controller 220 operates to handle interaction with external devices, such as the network 110, whilst the multi-function controller 225 operates to control the scanner 200, printer 205, fax 210 and copier 215, to allow desired jobs to be performed. It will therefore be appreciated that the controllers are typically implemented as software executed by a suitable processor, which is operating under control of appropriate software applications stored in a store (not shown).

In particular, in one example, the software installation processes described in more detail below may be performed through the use of a suitable module loaded into the processor from memory, and this is typically implemented by the multifunction controller 225. This may be achieved in any one of a number of manners, but in one example may be achieved using a JAVA module that activates a graphical user interface (GUI) on the touch screen 240, and interacts with the computer 120 and/or the servers 130 as required. This allows the MFD 100 to display information and options relating to the installation process, as well as to allow the user to provide input commands to control the installation process. In addition to this, this allows the MFD to communicate with the computers 120, servers 130 and databases 140 as required, in order to allow the installation process to be completed, as will be described in more detail below.

Figure 3:
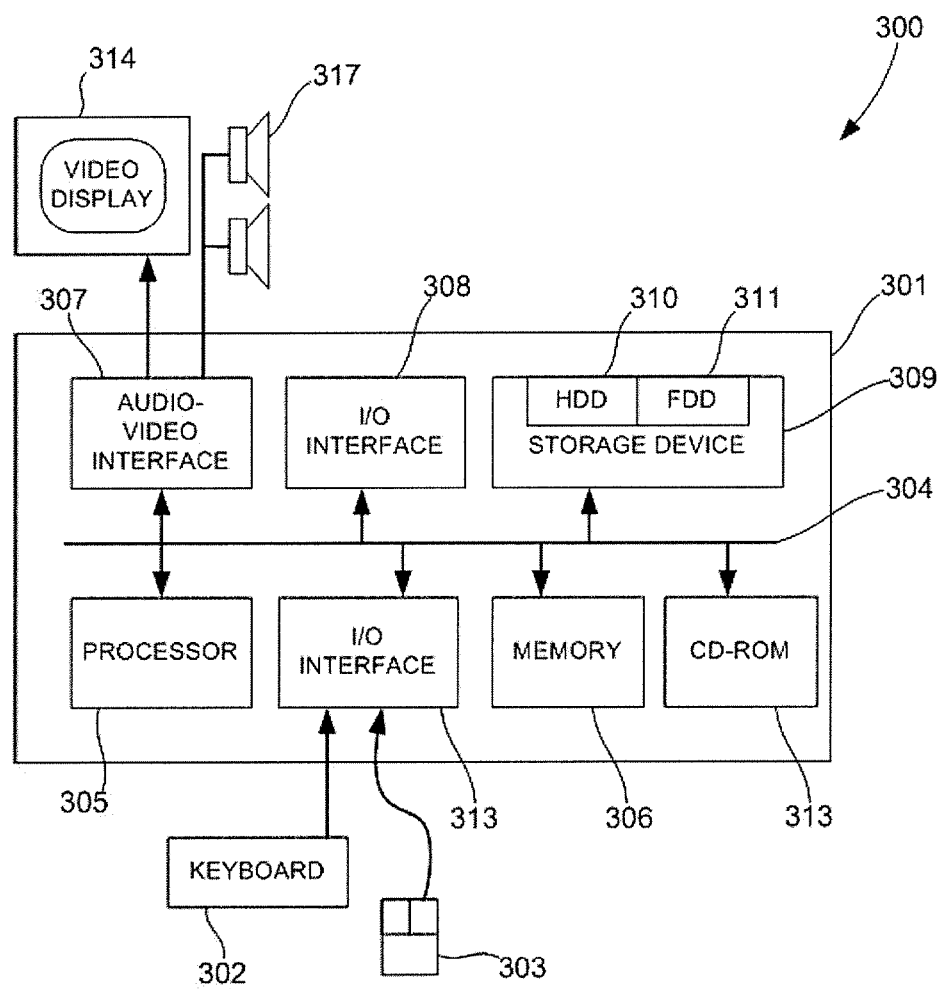
FIG. 3 is a schematic diagram of an example of a computer.

An example of a general-purpose computer 120 is shown in FIG. 3.

The computer system 300 is formed by a computer module 301, input devices such as a keyboard 302 and mouse 303, and output devices including a printer 315, a display device 314 and loudspeakers 317.

The computer module 301 typically includes at least one processor unit 305, and a memory unit 306, for example formed from semiconductor random access memory (RAM) and read only memory (ROM). The module 301 also includes an number of input/output (I/O) interfaces including an audio-video interface 307 that couples to the video display 314 and loudspeakers 317, and an I/O interface 313 for the keyboard 302 and mouse 303 and optionally a joystick (not illustrated). An I/O interface 308, such as a network interface card (NIC) is also typically used for connecting to the computer to the network 110.

A storage device 309 is provided and typically includes a hard disk drive 310 and a floppy disk drive 311. A magnetic tape drive (not illustrated) may also be used. A CD-ROM drive 312 is typically provided as a non-volatile source of data.

The components 305 to 313 of the computer module 301, typically communicate via an interconnected bus 304 and in a manner that results in a conventional mode of operation of the computer system 300 known to those in the relevant art. Examples of computers on which the described arrangements can be practised include IBM-computer's and compatibles, Sun Sparcstations or the like.

The processes of performing jobs such as printing is typically implemented using software, such as one or more application programs executing within the computer system 300. Typically, the application activates a GUI on the video display 314 of the computer system 300 which displays documents to be printed, or scanned or copied documents.

In particular, the methods and processes are affected by instructions in the software that are carried out by the computer. The instructions may be formed as one or more code modules, each for performing one or more particular tasks. Typically the execution of the instructions may require a number of different application programs to interact, and may also require the presence of a suitable driver that is configured to operate with a specific device or MFD.

The software may be stored in a computer readable medium, and loaded into the computer, from the computer readable medium, to allow execution. A computer readable medium having such software or computer program recorded on it is a computer program product. The use of the computer program product in the computer preferably provides an advantageous apparatus for distributed printing, scanning or copying.

The term "computer readable medium" as used herein refers to any storage or transmission medium that participates in providing instructions and/or data to the computer system 300 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 301. Examples of transmission media include radio or infra-red transmission channels as well as a network connection to another computer or networked device, and the Internet or Intranets including e-mail transmissions and information recorded on Websites and the like.

Figure 4:
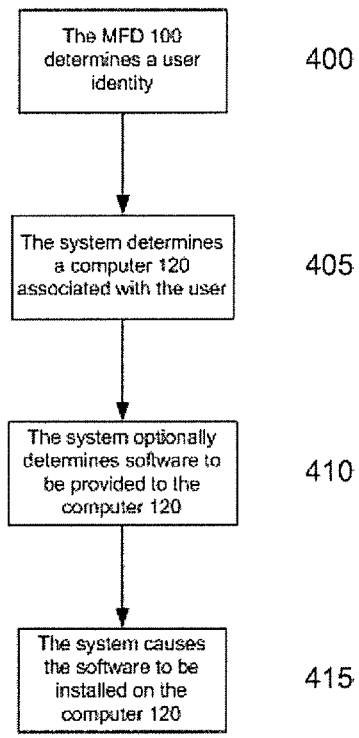
FIG. 4 is a flow chart of an example of a process for installing software on a computer.

An example of the process for installing the software provided on a computer system 120 will now be described with reference to FIG. 4.

At step 400 the MFD 100 determines a user identity associated with a user of the MFD 100, thereby allowing the MFD 100 to identify and/or authenticate the user. At step 405, the MFD 100 determines a computer 120 associated with the user. This may be achieved in a number of manners and will depend to an extent on the configuration of the network 110.

Thus, in one example, the location of the computer 120 associated with the user may be known to a central server which tracks all user log-ins to all PCs as they occur. The MFD 100 may retrieve this information from this central server in order to determine which PCs a given user is logged into.

Typically, users are required to undergo an authentication or logon process to access the computer 120 and/or associated network services. In this case, the MFD 100 can require the user to undergo an equivalent logon process, with the system using provided logon information to first determine the user identity and then subsequently identify the user's computer 120. Such a logon process can be performed in any one of a number of manners including, for example:

1. Swiping an ID card at a card reader.
2. Entering a pin code or a password on the MFD, either via an LCD screen or the number panel on the MFD.
3. Authenticate by finger print reader.
4. Authenticate by retinal scanner.
5. Other authentication means.

At step 410 the system optionally determines software to be provided to the computer 120. This may be required, for example, if currently installed software is out of date, or does not meet requirements for performing a job.

For example, if the computer 120 is to be used for providing a print job, the computer 120 may need to have specific print drivers installed. Alternatively, if the job is a scan job, the MFD 100 may be configured to scan the document and produce image data in a predetermined format which is forwarded to the user's computer 120 for viewing. In this instance, viewing applications software, may be required to view the image.

However, additionally or alternatively, software may be periodically updated or reinstalled, irrespective of whether this is required, simply to ensure the latest version of the software is present on the computer 120.

Accordingly, whilst in one example the installation of software may occur in response to the provision of a job the MFD 100, this is not necessarily the case, and typically the installation of software is not job dependent.

The system then causes the software to be installed on the computer 120, at step 420.

Accordingly, it will be appreciated that this provides a mechanism which allows a user's computer 120 to be automatically configured with any software when the user utilises one of the MFDs 100. This can be performed for a number of reasons, but is typically used to ensure that the computer 120 includes any applications software required in order to perform a job on one of the MFDs 100.

Whilst this may be used to install any appropriate software, one of the main applications is the installation or updating of printer drivers. In particular, a number of different printer drivers may need to be installed on any computer in order to allow different MFDs 100 or other printing devices to function.

Figure 5A:
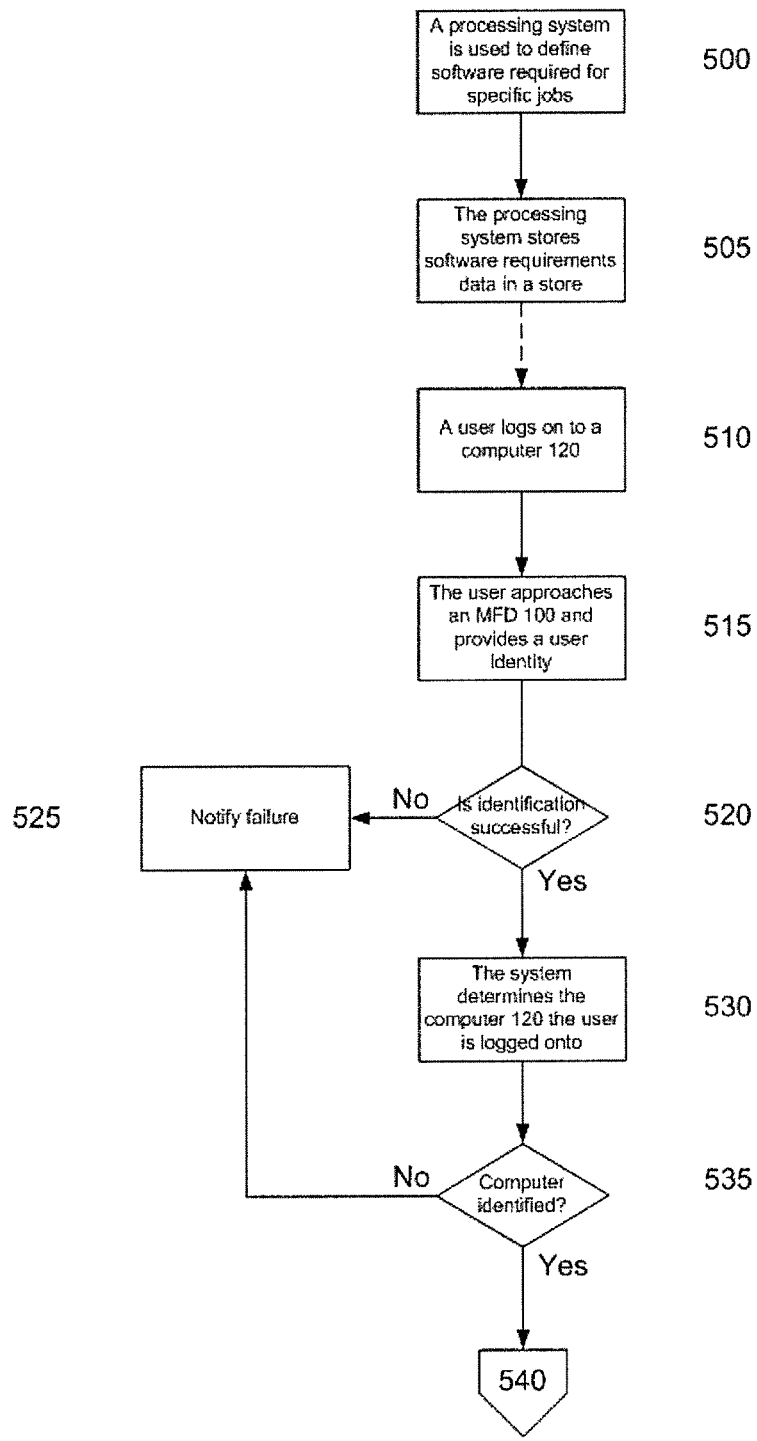
FIGS. 5A and 5B are a flow chart of a specific example of installing a printer driver on a computer; and, FIGS. 6A and 6B are schematic diagrams of an example of the process of installing software on specific ones of the computers shown in FIG. 1.
Figure 5B:
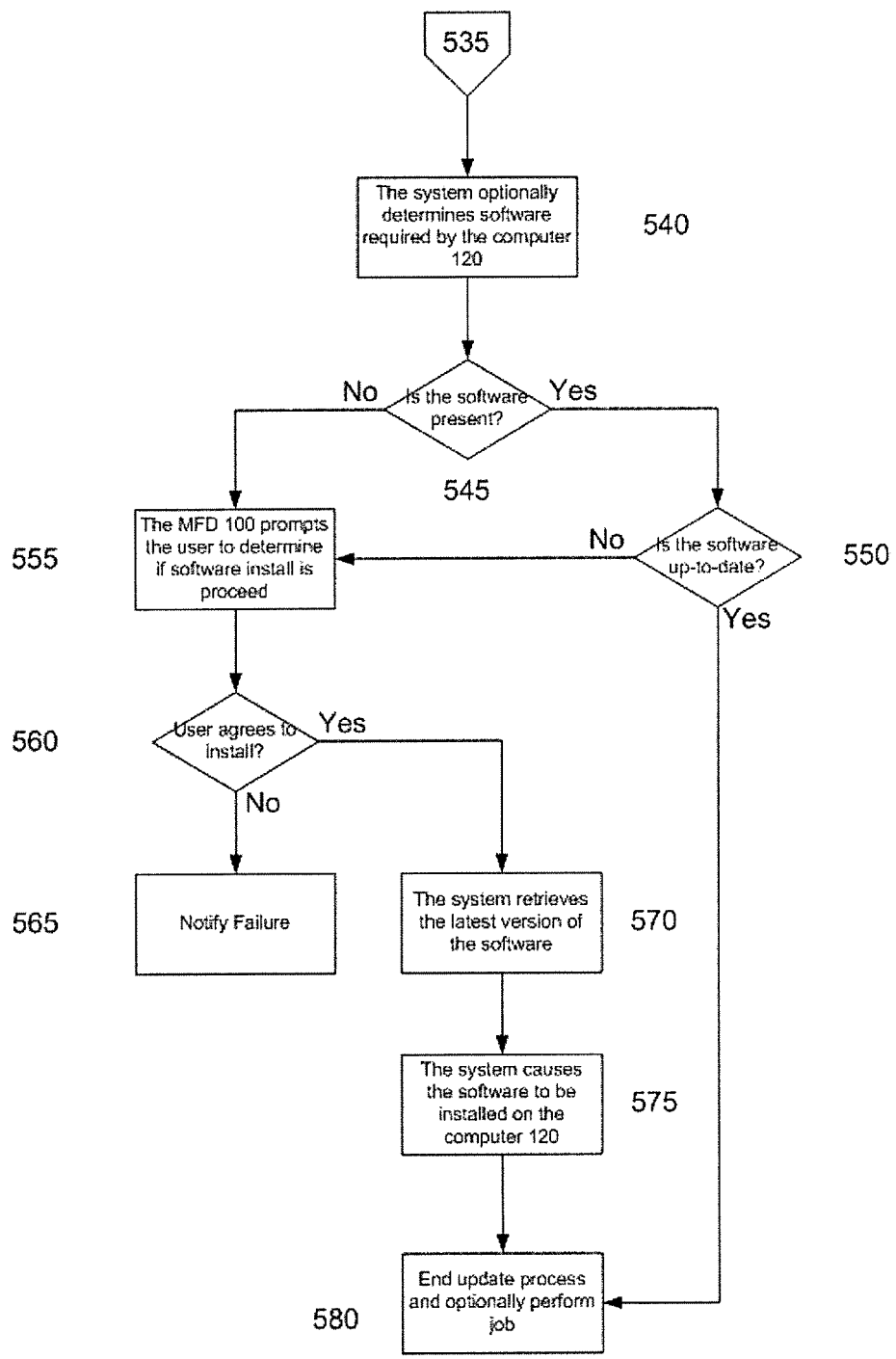

Accordingly, a specific example of the process of installing a print driver will now be described in more detail with respect to FIGS. 5A and 5B.

In particular, at step 500 the system is used to define software required for specific jobs. The software requirements specify for a given MFD 100, and a given job type, the applications software that should be installed on the computer 120, together with an indication of the latest software version. The software requirements may also specify any required parameters, such as the network address of the MFDs 100, or the like.

At step 505 the system then stores software requirements data defining the software requirements in a store, such as the database 140.

The process of creating software requirement definitions as performed in steps 500, 505 is generally only a single procedure and may be performed on a one off basis. However it will be appreciated that as software requirements change, such as when a new version of software becomes available, it is typical to update this as required.

It will also be appreciated that the use of software requirement definitions is only a single example, and that this may not be required. For example, if the software is simply a printer driver for one of the computers 120, software requirement definitions may not be needed. In this instance, it may be sufficient to ensure that the correct printer driver is available from one of the devices coupled to the network, such as one of the MFDs 100, or the servers 130, thereby allowing it to be loaded to the computers 120 as required. It will also be appreciated that other methods for defining software updates or installs may also be used.

At step 510, a user logs on to one of the computers 120. The logon procedure will typically involve having a user provide a user identity, which may include authentication information such as a username and password or other identifier, such as a PIN (Personal Identification Number), biometric information, or the like. The user will then typically be authenticated by having the computer 120 transfer the supplied authentication information to an authentication server 130, which will compare this to predetermined authentication data stored in an authentication database 140. This is a standard procedure and will not therefore be described in any further detail.

Once logon is complete, the user approaches an MFD 100 at step 515, and provides an indication of the user identity. This may involve having the user input a username and password or PIN (Personal Identification Number) using the touch screen 240 and/or the keypad 245. Alternatively the data may be provided by way of interaction with the recognition device 250, for example to allow biometric information, RFID tags or the like to be used.

Typically the provision of the user identity is performed as part of a logging on procedure, in which case it is typical for the MFD 100 to authenticate the user. The authentication process could be a search on an Active Directory server for the user's entry in the network domain, or could be achieved by transferring the authentication information to the authentication database 140 for comparison to stored authentication information.

If identification of the user is unsuccessful, for example, if the authentication fails, then the job is typically halted and the user notified of the failure at step 525. This is typically achieved through the use of a prompt displayed on the touch screen 240 although any suitable mechanism may be used.

At step 530, once the MFD 100 has either authenticated the user, or at least determined the user's identity, the system determines the computer 120 associated with the user. This may again be performed in a number of manners depending on the network architecture and the preferred implementation.

For example, in the event that authentication or identification information has been obtained, this can be used to access a domain controller, typically implemented by one of the servers 130. The system can then check each and every computer 120 in a specified domain to determine if the user is logged on to that respective computer. Alternatively, the computers 120 can be adapted to execute a script when a user logs on, causing an LUT (Look-Up Table) stored in a central location, such as a database 140, to be updated with details of the respective user. In this instance, the MFD 100 can simply access the LUT and determine the relevant computer 120 therefrom.

At step 535, the MFD 100 assesses whether the user's computer 120 is identified, and if not the user is notified of the failure at step 525, as described above. Whilst the process can end at this point, as an alternative the user could be provided with a list of computers 120 connected to the network 110, allowing the user to manually select a computer 120 via the touch screen 240. However, this may have security implications and in some examples is not used.

Assuming that the computer is identified at step 535, the process moves on to step 540, with the system optionally determining any software required by the computer 120 to perform the job. This may be performed by the MFD 100, or by any other suitable processing system coupled to the network 110, such as server 130, following appropriate instruction from the MFD 100.

Identification of required software can be achieved by accessing the software requirements data stored in the database 140. The software requirements data will list, for the particular MFD, and the particular job the software that is required, together with an indication of the latest version of the software. However, it will be appreciated that this may not be essential, and that as an alternative, the MFD 100 may determine required software in accordance with user inputs, or may by default attempt to install the software.

At step 545, the system determines if required software is present. This could be achieved for example by comparing the software currently installed on the computer 120 with the software requirements to determine if the required software is present. Alternatively, this may be achieved by attempting to perform a job, and determine that the software is required in the event that the job fails.

If it is determined that the required software is present on the computer 120 at step 545, the system may perform an additional check to determine if the software is up to date at step 550.

If the software is present and up to date, the MFD 100 will typically end the update/installation process and then optionally perform any required or pending jobs at step 580.

However, if there is a negative determination at either of steps 545 or 550, and it is determined that required software is not present, or up to date, the MFD 100 prompts the user to determine if software installation is to proceed at step 555. This is typically achieved using a prompt displayed on the touch screen 240. Thus, for example, the touch screen 240 may be used to display a prompt indicative of the required installation, such as:

"You are logged in on PC (PC12345), which has no print driver installed. Would you like to install a suitable driver now?".

If the user does not agree to the software install at step 560, the process ends, with the user being notified of the failure at step 565. Otherwise, if the user agrees to the software install, then the latest version of the software is retrieved at step 570, and installed on the user's computer at step 575.

As part of this process, the system may require details of the current configuration of the MFD 100, and the computer 120, for example to determine any parameters required for the installation. This can include information such as port numbers, print driver type, print driver location, client computer location, MFD network address and operating system version.

The retrieval of system information and software, as well as the installation process may be controlled in any one of a number of manners.

For example, information relating to the MFD 100 and the computer 120 could be determined by having one of the processing systems interrogate the MFD 100 and or the computer 120. Alternatively, this information could form part of the software requirements data, or be specified for each computer 120 and each MFD 100 on the network 110 in a separate configuration file, as will be appreciated by persons skilled in the art.

The software installation could be performed by any suitable processing system within the overall architecture. This could include for example, the MFD 100 itself, or alternatively, a respective one of the servers 130. This latter option may be preferred as the server 130 can be configured with the necessary access privileges that allow software upgrading to be performed, whereas this is not necessarily the case for the MFD 100.

However, it will be appreciated that in the case of basic software such as printer drivers, it may be preferable to have the printer driver stored on and installed by the MFD 100, thereby reducing requirements for additional processing systems.

The software installation may also be performed using a variety of techniques, but is typically achieved by constructing a package containing the necessary applications software, or links to the software, and any necessary parameter information, which is then transferred to the computer 120. The package can be in the form of a self-executing package, which once received by the computer 120, is automatically executed to cause the software to be installed, or alternatively the installation could be controlled by any other one of the processing systems coupled to the network 110.

In any event once the software is installed, the software installation process ends with the MFD 100 optionally continuing to perform any pending jobs at step at 600.

It will be appreciated that the above described process may occur at any suitable time such as prior to, after, or during the performance of a job by the MFD 100. This will depend on a range of factors, such as the job involved, the extent to which the software is required to perform the job, and the preferred implementation of the system.

Thus, for example, if the document handling job is a print operation to be initiated by one of the computers 120, this may require the computer 120 transfer print data via the communications network 110 to the MFD 100. This may only be possible if the computer 120 has the correct printer driver installed, thereby allowing the computer 120 to communicate with the MFD 120. In this case, it is therefore typically necessary to ensure the software and in particular the printer driver installed on the computer 120 is up to date, using the above described process, prior to initiating the print job.

In contrast to this, in the case of scanning or copying a document, then it would be typical for the user to provide all or part of a hardcopy document to a particular one of the MFDs 100, in which case this may be performed prior to performing the update/installation process described above, to allow any necessary document viewers to be installed.

A specific example of the process of updating printer drivers and other installed software will now be described with reference to FIGS. 6A and 6B, which respectively show software installed on two of the computers of FIG. 1 prior to and after the above described process is performed.

In this example, a user 700 is logged onto both of the computers 120A, 120B. The list of required applications and device drivers required by the MFD 100 includes a Print Driver A version 3.1 and a Document Viewer A. As also shown, in this example, the database 140 includes software corresponding to Print Driver A version 3.1, Print Driver B version 3.1, . . . Print Driver E version 3.1, as well as Document Viewer A and Document Viewer B. It will be appreciated that these could be any suitable form of print driver and document viewer.

Figure 6A:
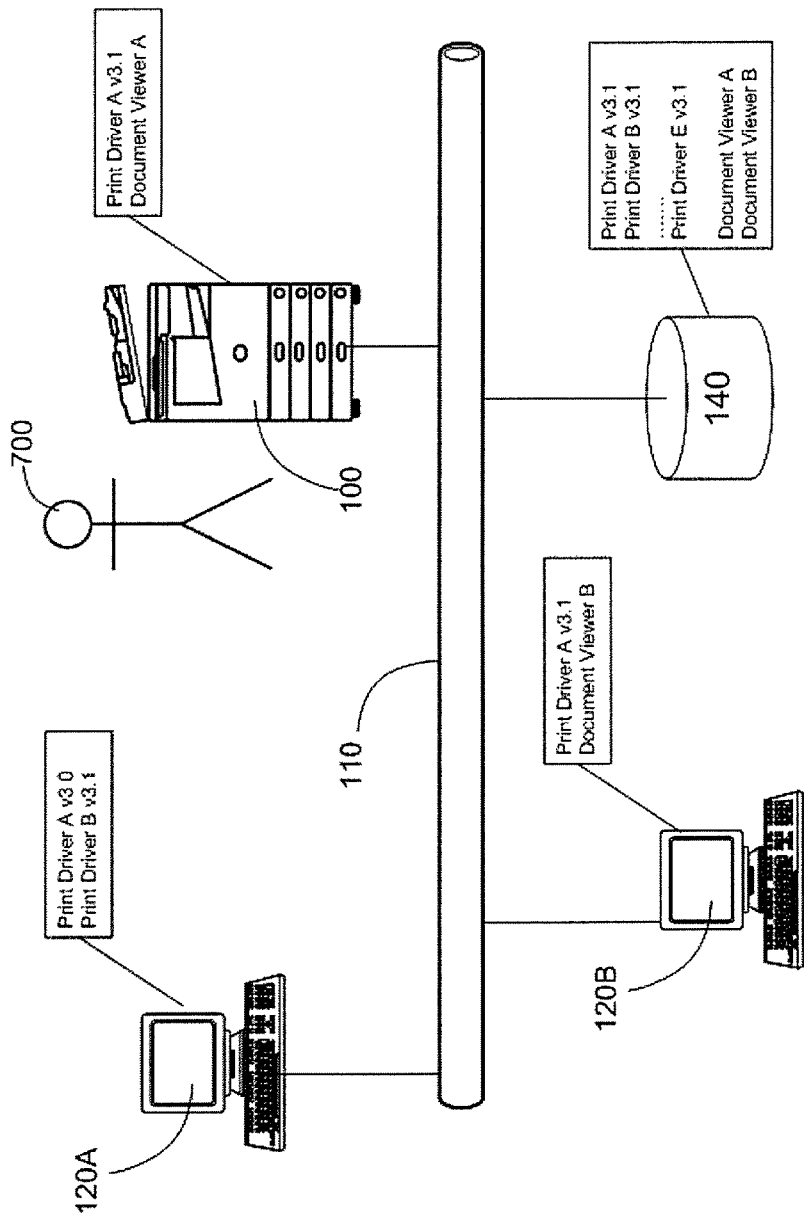

Initially, as shown in FIG. 6A, the computer 120A is already installed with Print Driver A version 3.0 and Print Driver B version 3.1, whilst the computer 120B is installed with Print Driver A version 3.1 and Document Viewer B.

As the user 700 logs onto, and hence identifies him/herself to the MFD 100, the system checks the computers 120A, 120B for missing or out of date software and drivers. In this instance, the computer 120A does not include any of the required software, as Print Driver B v3.1 is not the correct print driver, whilst Print Driver A v3.0 is out of date. Similarly, no document viewer is installed. In the case of the computer 120B, this already has an up to date version of the print driver Print Driver A v3.1, but does not have the correct document viewer installed.

Figure 6B:
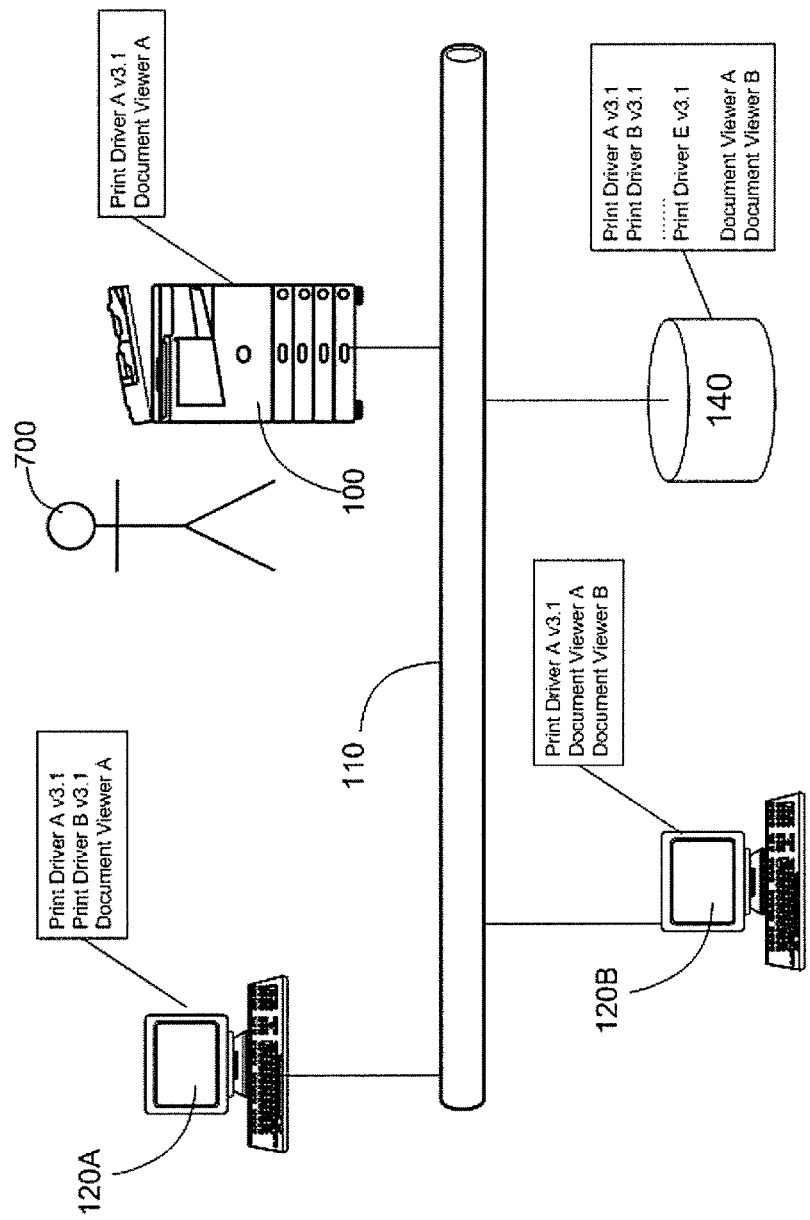

Accordingly, the system causes the Print Driver A v3.1 and Document Viewer A to be installed on the computer 120A, as shown in FIG. 6B. This may be achieved for example by having the system, such as a server 130, compose a package containing Print Driver A v3.1 and Document Viewer A and transfer this to the computer 120A for installation. Alternatively, this can be performed by the MFD 100, or a combination of the two. Thus, for example, installation of print drivers may be performed by the MFD 100, with a server 130 creating a software package to allow installation of the document viewer.

Similarly, in the case of the computer 120B, the system determines only Document Viewer A is required, generates an appropriate package, and transfers this to the computer 120B, thereby installing the additional software, as shown in FIG. 6B.

It will be appreciated that packages arriving at the computers 120A and 120B can be automatically installed, either with or without user's confirmation.

Accordingly, the above described system is capable of:
1) Automatically installing a correctly configured device driver on a user's computer.
2) Installing any third party applications on a user's computer.
3) Updating any out-of-date applications or device drivers on the user's computer.

Typically, the user would first log onto a computer that is on the network, and then physically locate an arbitrary MFD for use. When the user identifies themself to the MFD, the system can locate all of the user's currently logged-on computers, checks if each computer already has a print driver configured for the MFD that the user is currently at, and if necessary, installs the correctly configured printer driver onto the user's computer.

In one example, where the user's computer already has the corresponding print driver installed, the system will not proceed with the print driver installation. In another example, where the user's computer has an older version of the print driver, the driver will be updated by a reinstallation of a newer version of the print driver.

The parameters required for installing a print driver, such as port number, print driver type, print driver location, client computer location and operating system version, are automatically detected and determined by the system.

In addition, the system allows the installation and upgrading of other device drivers (e.g. TWAIN scan driver), and other third party application such as Adobe Acrobat Reader.

This allows the user to control the installation and updating of software via the MFD, with the software installation being achieved by the system, with the required steps being automatically distributed between the MFDs 100 and the servers 130 as required.

In the above described examples, it will be appreciated that the MFD operation is typically controlled using a Java module executed by an appropriate processor, such as the multi-function controller, although any suitable control mechanism may be used.

In the above described examples, specific reference is made to applications software. However, it will be appreciated that this encompasses installing multiple software applications, elements, or other modules, such as drivers, simultaneously. Furthermore, whilst the description refers generally to installing software applications, the techniques can also be applied to updating software applications as described.

The term document handling job is intended to encompass any document processing operation utilising, at least in part, a hard copy document. The term therefore encompasses operations such as scanning, copying, printing and faxing of documents.

It will be appreciated from this that whilst the above examples have been described with respect to MFDs, the techniques may be applied to any devices that are capable of performing document handling jobs, such as printers, copiers, scanners, reproduction devices, facsimile machines, or the like.

The term system is also understood to encompass any one of the processing systems provided in the network environment, including but not limited to one or more of the computers 120, the servers 130, and the controllers implemented within the MFDs.

The term software package encompasses any data that can be transferred to a computer to allow software to be installed thereon.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of installing software on a computer associated with a user, the computer being coupled to a system including one or more document handling devices connected to the computer via a communications network, the method comprising, the steps of:
    in a document handling device having at least one of a touch screen, a keypad and a recognition device:
        inputting an indication of a user identity via at least one of the touch screen, the keypad and the recognition device,
        identifying any computers coupled to the communications network;
        for any computers coupled to the communications network, determining if the user is logged onto the computer using the user identity, and
        determining the user identity associated with the user; and in at least part of the system:
        obtaining configuration information about the document handling device from the document handling device,
        determining the computer associated with the determined user identity,
        determining a job type of a job which is performed at the document handling device for the user,
        in response to determining the job type, determining, in the document handling device or one or more servers in communication with the document handling device via the communications network, software for installation at the determined computer according to the job type and the configuration information about the document handling device; and
        transferring the determined software that drives the document handling device to the determined computer via the communications network, thereby causing the software to be installed.

2. The method according to claim 1, wherein the at least part of the system is the document handling device, and wherein the method further comprises, transferring the software package from the document handling device to the computer.

3. The method according to claim 1, wherein the method includes, in the document handling device, halting a process in response to at least one of: input commands from a user; an unsuccessful authentication; and failure to identify the computer associated with the user.

4. The method according to claim 1, further comprising: providing an indication to the user of software to be installed; and installing the software in response to the user agreeing to the installation.

5. The method according to claim 1, wherein the software to be installed comprises at least one of: a print driver; other device drivers; and any third party applications.

6. The method according to claim 1, wherein the document handling device is at least one of: a printer; a scanner; a reproduction device; and a multi-function device.

7. The method according to claim 1, wherein the document handling device is performing a job, the job being at least one of: printing a document; scanning a document; and copying a document.

8. A document handling device for installing software on a computer associated with a user, the document handling device being connected to the computer via a communications network, wherein
    the document handling device comprises at least one of:
        a touch screen;
        a keypad; and
        a recognition device,
    wherein the document handling device is configured to:
        receive an indication of a user identity input via at least one of the touch screen, the keypad and the recognition device,
        identify any computers coupled to the communications network;
        for any computers coupled to the communications network, determine if the user is logged onto the computer using the user identity, and
        determine the user identity associated with the user,
        obtain configuration information about the document handling device,
        determine the computer associated with the user identity,
        determine a job type of a job performed at the document handling device for the user,
        determine, in response to determining the job type and in the document handling device or one or more servers in communication with the document handling device via the communications network, software to be installed at the determined computer according to the job type and the configuration information about the document handling device, and transfer the determined software to the determined computer via the communications network, thereby causing the software to be installed.

9. The document handling device according to claim 8, wherein the one or more servers include a store, wherein the document handling device communicates with the one or more servers to obtain, from the store, at least one of: software requirements data; and authentication data defining authorized users of the document handling devices.

10. A non-transitory computer-readable storage medium for installing software on a computer associated with a user, the computer forming part of a system comprising one or more document handling devices connected to the computer via a communications network, the computer-readable storage medium storing executable code which when executed by one or more suitable processors causes:

in a document handling device, having at least one of a touch screen, a keyboard and a recognition device:

inputting an indication of a user identity via at least one of the touch screen, the keyboard and the recognition device, and identifying any computers coupled to the communications network;

for any computers coupled to the communications network, determining if the user is logged onto the computer using the user identity, and determining the user identity associated with the user; and in at least part of the system:

obtaining configuration information about the document handling device from the document handling device, determining the computer associated with the determined user identity, determining a job type of a job which is performed at the document handling device for the user, in response to determining the job type, determining, in the document handling device or one or more servers in communication with the document handling device via the communications network, software for installation at the determined computer according to the job type and the configuration information about the document handling device, and transferring the determined software to the determined computer via the communications network, thereby causing the software to be installed.

* * * * *